(12) United States Patent
Ricco et al.

(10) Patent No.: US 9,155,322 B2
(45) Date of Patent: Oct. 13, 2015

(54) FROZEN CONFECTIONERY PRODUCT WITH LAYERED STRUCTURE AND APPARATUS FOR MANUFACTURING SAME

(75) Inventors: Massimilliano Ricco, Parma (PR) (IT); Jean-Michel Marchon, Beauvais (FR)

(73) Assignee: Nestec S.A., Vevey (CH)

( * ) Notice: Subject to any disclaimer, the term of this patent is extended or adjusted under 35 U.S.C. 154(b) by 220 days.

(21) Appl. No.: 13/522,254

(22) PCT Filed: Jan. 11, 2011

(86) PCT No.: PCT/EP2011/050261
§ 371 (c)(1),
(2), (4) Date: Jul. 13, 2012

(87) PCT Pub. No.: WO2011/086058
PCT Pub. Date: Jul. 21, 2011

(65) Prior Publication Data
US 2013/0045310 A1   Feb. 21, 2013

(30) Foreign Application Priority Data
Jan. 15, 2010  (EP) .................................... 10150904

(51) Int. Cl.
*A23G 9/28*  (2006.01)
*A23G 9/48*  (2006.01)

(52) U.S. Cl.
CPC  *A23G 9/282* (2013.01); *A23G 9/28* (2013.01); *A23G 9/283* (2013.01); *A23G 9/48* (2013.01)

(58) Field of Classification Search
CPC ........... A23G 9/285; A23G 9/28; A23G 9/48; A23G 9/50; A23G 9/22; A23G 9/282; A23G 9/283; A01B 12/006

USPC ............. 426/438, 516, 512, 515; 99/452, 466
See application file for complete search history.

(56) References Cited

U.S. PATENT DOCUMENTS

| | | | |
|---|---|---|---|
| 1,951,694 A | 3/1934 | Price | |
| 2,284,651 A | 6/1942 | Gundlach | |
| 3,347,287 A * | 10/1967 | Geber | ........................... 141/105 |
| 5,603,965 A | 2/1997 | Daouse | |

(Continued)

FOREIGN PATENT DOCUMENTS

| EP | 0322952 | 7/1989 |
|---|---|---|
| EP | 1980153 | 10/2008 |

(Continued)

OTHER PUBLICATIONS

International Search Report PCT/EP2011/050261 mailing date Apr. 26, 2011—6 pages.
Written Opinion of the International Searching Authority PCT/EP2011/050261 mailing date Apr. 26, 2011—6 pages.

*Primary Examiner* — Steven Leff
(74) *Attorney, Agent, or Firm* — K&L Gates LLP

(57) ABSTRACT

The present invention relates to a frozen confectionery product and to a method of manufacturing same. It furthermore relates to an apparatus for manufacturing a frozen confectionery product by rotary vertical extrusion. Said apparatus comprises a nozzle (14) at least one ice-cream passage (20, 22) with at least one inlet port (24, 26) and an outlet port (28), and at least one chocolate passage (30, 32) with respectively an inlet port (34, 36) and an outlet port (38, 38'). The outlet ports are provided in the nozzle (14) and have elongated cross-sections, and each chocolate outlet port (38, 38') extends in parallel to an ice cream outlet port (28), so as to form annular or helical chocolate layers upon rotation of the nozzle and the container with respect to each other.

10 Claims, 4 Drawing Sheets

(56) References Cited

U.S. PATENT DOCUMENTS 6,390,662 B1 * 5/2002 Henry et al. ............... 366/177.1
2006/0251783 A1 11/2006 D'Esposito et al.

FOREIGN PATENT DOCUMENTS

JP 55092656 7/1980
WO 9526640 10/1995

* cited by examiner

FROZEN CONFECTIONERY PRODUCT WITH LAYERED STRUCTURE AND APPARATUS FOR MANUFACTURING SAME

CROSS REFERENCE TO RELATED APPLICATIONS

The present application is a National Stage of International Application No. PCT/EP2011/050261, filed on Jan. 11, 2011, which claims priority to European Patent Application No. 10150904.0, filed on Jan. 15, 2010, the entire contents of which are being incorporated herein by reference.

FIELD OF THE INVENTION

The present invention relates to a frozen confectionery product with a layered structure and to a method and an apparatus for manufacturing the same.

BACKGROUND OF THE INVENTION

Various frozen confectionery products containing inclusions or crispy layers of a fat-based coating exist.

U.S. Pat. No. 5,135,767 discloses to make a cup or a cone having a flaky texture, superposed ribbons of ice cream and chocolate are extruded into a mold in the form of spirals by means of an extrusion assembly comprising a flat extrusion tube and a spray tube. The extrusion assembly receives a spinning movement resulting from an eccentric rotational movement and an ascending movement relative to the mold. However, as the chocolate is sprayed onto the ice cream, it is very difficult to control the thickness of the chocolate layers and virtually impossible to obtain regular crunchy layers of a desired thickness. Furthermore the spraying mechanism is relatively expensive.

In U.S. Pat. No. 5,283,070 a layered cone with alternating layers of chocolate and ice cream is made by extruding an ice cream into a vertically descending helix rotating about a vertical axis and having spaced flights which define passages therebetween the helix. Chocolate is sprayed into these passages of the extruded helix. Here also it is very difficult to control the thickness and crunchiness of the chocolate layers, and the apparatus is rather expensive due to the spraying process.

U.S. Pat. No. 5,603,965 relates to the production of cakes of ice confectionery containing integrated decorative layers of crisp material such as chocolate. The ice cream is horizontally extruded, and chocolate is sprayed on an ice cream layer. Here also it is difficult and costly to control the thickness of the chocolate layers.

EP 0 221 757 A2 discloses an ice cream product containing chocolate flakes. The ice cream is extruded from a nozzle into a cone or a mold, and chocolate is ejected with high speed towards a stream of ice cream issued from the nozzle so as to penetrate the ice cream and form a thin strip like layer therein. It is not possible to obtain a regular, layered structure with such a method.

Other methods for producing layered ice cream products are known from prior art where the chocolate stays relatively long in contact with the ice cream, e.g. using a chocolate nozzle rotating inside an ice cream flow. These methods do not work with real chocolate, which has a higher melting point than fat-based coatings and will thus quickly clump.

OBJECT OF THE INVENTION

It is thus the object of the present invention to provide an apparatus and a method for making frozen confectionery products which overcomes the drawbacks mentioned above. It is furthermore the object of the present invention to provide a novel frozen confectionery product, comprising very thin and crispy chocolate layers which are regularly distributed in the product.

SUMMARY OF THE INVENTION

This object is achieved by the apparatus according to claim 1, the method according to claim 8 and the frozen confectionery product according to claim 10.

According to the invention, the apparatus for making a frozen confectionery product by vertical extrusion comprises:
- a nozzle,
- at least one ice-cream passage with at least one inlet port and an outlet port, and
- at least one chocolate passage with an inlet port and an outlet port.

The outlet ports have elongated cross-sections, and a chocolate port extends next to an ice cream port in parallel thereto, so that a chocolate stripe is "painted" on the ice cream strip which is extruded. When the nozzle and the container are rotated with respect to each other, annular or helical chocolate layers separated by ice cream layers are formed.

According to a preferred embodiment there are at least two chocolate outlet ports.

This makes it possible to obtain two chocolate helixes in one step. According to a preferred embodiment of the invention, at least two chocolate passages with respectively an inlet port and an outlet port are provided, i.e. each outlet port is connected to its own chocolate passage with its own inlet port, and the chocolate flow is thus metered separately for each outlet port. This avoids clumping of chocolate in one of the circuits. Furthermore this gives the possibility of making a product having different crunchy layers, for example different types of chocolate or other layers.

According to another preferred embodiment of the invention, one common inlet port leads through a chocolate passage to two outlet ports. This solution still allows it to obtain two helices in one step, but is less complex.

It should be noted that, where nothing else is specified, the term "chocolate" used in the present application should comprise any composition similar to a recipe containing cocoa or chocolate which can form crunchy layers in an ice cream product. Furthermore, it should be noted that the elongated cross section of the outlet ports can have any shape, in particular it can be rectangular, but also curved.

According to a preferred embodiment of the invention, the apparatus comprises a fixed body, and the nozzle can be rotated with respect to said fixed body. The inlet ports are then provided in the fixed body and the outlet ports in the rotatable nozzle. Preferably the rotatable nozzle and the fixed body are coaxial to each other. The inlet ports can thus be distributed around the apparatus and be connected to the outlet ports through annular passages.

Alternatively, the apparatus and the nozzle can remain static, and the container is rotated during extrusion.

In the same way, the apparatus may comprise a motor for a vertical movement so that it can be moved away from the container while filling it. Alternatively, the container can be moved away from the apparatus and the apparatus remains static.

According to a preferred embodiment of the invention, two outlet ports of the chocolate passages are arranged symmetrically with respect to a central ice-cream outlet port on opposite sides thereof. This makes it possible to extrude a stripe of ice cream being "painted" with chocolate on both sides, so that one obtains two chocolate helixes which will start and end on different sides of the container. The chocolate outlet ports can be laterally offset with respect to each other, and by designing the geometry of the outlet ports adequately, one can obtain a product with two chocolate helixes, which will never be in contact with each other, but always be separated by the ice cream layer.

Various other geometries of the outlet ports are possible and fall within the scope of the present invention. It is for example possible to use several ice cream outlet ports, for instance three ice cream outlet ports arranged in a star-like conformation, or four ice cream outlet ports arranged in a cross-like conformation. For each ice cream outlet port one can provide a chocolate outlet port "painting" a chocolate stripe on the extruded ice cream stripe. This allows it to create a multitude of interesting products combining different ice cream flavours, ice cream and sorbet, etc. The chocolate can also for some of the outlet ports be replaced by another, either crunchy or softer material such as a caramel, a fruit sauce, etc.

According to a preferred embodiment of the invention, the chocolate passage or passages are separated and insulated from the ice-cream passage and join the ice-cream passage only at the outlet port. This avoids that the liquid chocolate is chilled by the ice cream which could lead to undesired clumping of the chocolate. The chocolate can be maintained at a temperature above its melting point and solidifies only after the extrusion when it is in direct contact with the ice cream and forms the desired layer. It is thus possible to obtain very thin and regular chocolate layers.

The apparatus can further comprise a hot air passage having an inlet port and an outlet port, said outlet port being directed towards the chocolate passage such that hot air exiting said outlet port heats up the chocolate passage. The chocolate is thus kept at a temperature which is above its melting temperature so that it remains liquid and solidifies only after extrusion.

The chocolate passage or passages can at least partly be formed by flexible hoses.

According to a preferred embodiment of the invention, the ice-cream passage has two ice-cream inlet ports both leading into the passage before the outlet port. It is thus possible to use two different ice cream flavours. Preferably one will chose two ice cream flavours having a different appearance, so that the final product will not only contain chocolate layers but will also have a layered structure with two different types of ice cream alternating. This also allows giving an appealing appearance to the top of the product, which may have a swirled decoration due to the two visually distinctive types of ice cream extruded through the ice cream outlet.

Preferably the longitudinal diameter of each of the chocolate outlet ports corresponds to less than half of the longitudinal diameter of the ice cream outlet port. Furthermore, in order to obtain thin layers of chocolate separating thicker layers of ice cream, the transversal diameter of the chocolate outlets will be much smaller than the transversal diameter of the ice cream outlet.

Typically the ice cream outlet may have a longitudinal diameter corresponding basically to the diameter of a tub to be filled, while the chocolate outlets would have a smaller longitudinal diameter.

The method for manufacturing a frozen confectionery product uses an apparatus as described above. Ice-cream and chocolate are simultaneously extruded through the respective outlet ports into a container, while the nozzle and the container are rotated with respect to each other. At the same time the distance between the container and the nozzle is increased, either by moving the apparatus upwards in a vertical movement, or by moving the container downwards.

As already mentioned above, according to a preferred embodiment of the invention, two different types of ice cream having a visually different appearance are fed to the apparatus through two ice cream inlets so as to obtain a layered ice cream structure. It also possible to use three or more different types of frozen confectionery, e.g. different ice cream flavours, and to extrude them through separate or combined ice cream outlet ports.

The frozen confectionery product according to invention comprises a container such as a tub or a cup, preferably in an individual portion size. The container can also be an edible container such as a wafer cup or cone. The product furthermore comprises an aerated frozen confection extruded into the container, wherein a plurality of thin chocolate patterns are provided in the aerated frozen confection. The frozen confection can be any extrudable, i.e. relatively soft, frozen confection such as ice cream, sherbet, sorbet, or frozen yoghurt. The chocolate patterns have the form of at least one, preferably two or more, substantially helical chocolate layers extending across the complete height of the container and forming substantially annular parallel chocolate layers. "Extending across the complete height of the container" means that the lower end of the helical chocolate layer is situated close to the bottom of the container, although it does of course not necessarily have to touch the bottom. In the same way the upper end of the chocolate layer lies close to the top of the frozen confection, although it might not be visible at the surface. When the frozen confection is cut vertically, the helical chocolate structure appears as a plurality of annular layers which are substantially parallel to each other and to the bottom of the container.

The top of the frozen confection may not be flat but rather conical, i.e. the cross section of the frozen confection when cut vertically may be tapered towards the top of the product. It is particularly attractive to have a spiral-like top with the helical chocolate structure being visible from the top. It is rather difficult to finish a traditional ice cream cone with a spiral-like top being extruded, as the shape retention of the extrudable frozen confection is in general not sufficient to achieve a form-stable shape. The chocolate layers provide additional shape retention to the ice confection in such a way that is now easier to obtain a stable, i.e. free-standing conical or spiral structure protruding from the container. The invention therefore opens up new possibilities of obtaining shaped tops, in particular for wafer cones, but also for transparent cups or any other type of container, the product thus being visually more attractive for the consumer.

It should be noted that the shaping effect can also be advantageously used when combining a frozen confection having relatively high shape retention on the outside of the product with a softer frozen confection, having a lower shape retention, e.g. a sorbet, on the inside.

Preferably the chocolate forming the layers is a real chocolate in the sense of the Directive 2000/36/EC of the European Parliament and of the Council of 23 Jun. 2000 relating to cocoa and chocolate products intended for human consumption, i.e. it contains little or no vegetable fat except for the cocoa butter which is naturally present in chocolate. Compared to the frequently used and cheaper fat-based materials, real chocolate has a better taste and a higher quality. As cocoa butter has a melting point of 34°-38° C., the melting point of the chocolate forming the layers is lying above 34° C. This is relatively high compared to fat-based materials which are frequently used for forming inclusions or crunchy layers in ice confections, and which have a melting point of around 24°

C. (corresponding to the melting point of coconut oil which is often added in fat-based chocolate compositions used in ice confectionery products). A layer of real chocolate having the same thickness will be perceived as more crunchy and crispy than a similar layer of fat-based material. However, due the high melting point, it is more difficult to work with real chocolate when making ice confectionery products, as clumping and forming of excessively thick layers is frequent.

The method and apparatus of the present invention make it possible to produce very thin, regular and crunchy layers of real chocolate.

Preferably the layers have a thickness of between 500 μm and 3500 μm, more preferably between 800 μm and 3500 μm, even more preferably between 900 μm and 2500 μm. Below a thickness of 500 μm the layers are not perceived as crunchy anymore. Below a thickness of 900 μm the crunchiness is getting less perceivable but may still be acceptable. Preferably, for at least 80%, preferably 90% of the surface of the layers, the layers have a thickness between 800 μm and 1800 μm with an average thickness lying around 1300 μm. When using real chocolate as explained above, consumers perceive the layers as crunchy, but not too hard to be spooned for a layer thickness lying in this range. The same perception may be achieved with a different layer thickness for different chocolate recipes.

Preferably the distance between two parallel chocolate layers lies between 4 and 10 mm, ideally between 8 and 9 mm for a cup or tub. This means that for example for an ice cream cup having a height of 40-45 mm, 4 to 6 layers of chocolate will be present, while 8 to 12 layers would be present in a cup having a height of 80-90 mm. This distance leads to a well balanced product. In a cone the ice cream layers may be thinner, for example between 4 to 6 mm. One can thus obtain a cone of a standard format having 4 to 6 chocolate layers in the lower "base" part and one or two additional layers in the top part which can have a spiral shape.

According to a preferred embodiment of the invention, the aerated frozen confection has itself a helically layered structure formed by at least two visually different types of aerated frozen confection alternating with the chocolate layers. Such a product is not only visually more appealing, but the use of two different types of aerated frozen confection, e.g. two different ice cream flavours, gives a lot of possibilities to create interesting dessert compositions.

FIGURES

The present invention is further described hereinbelow referring to the accompanying drawings which illustrate one preferred embodiment of the invention.

DETAILED DESCRIPTION OF THE INVENTION

Figure 1:
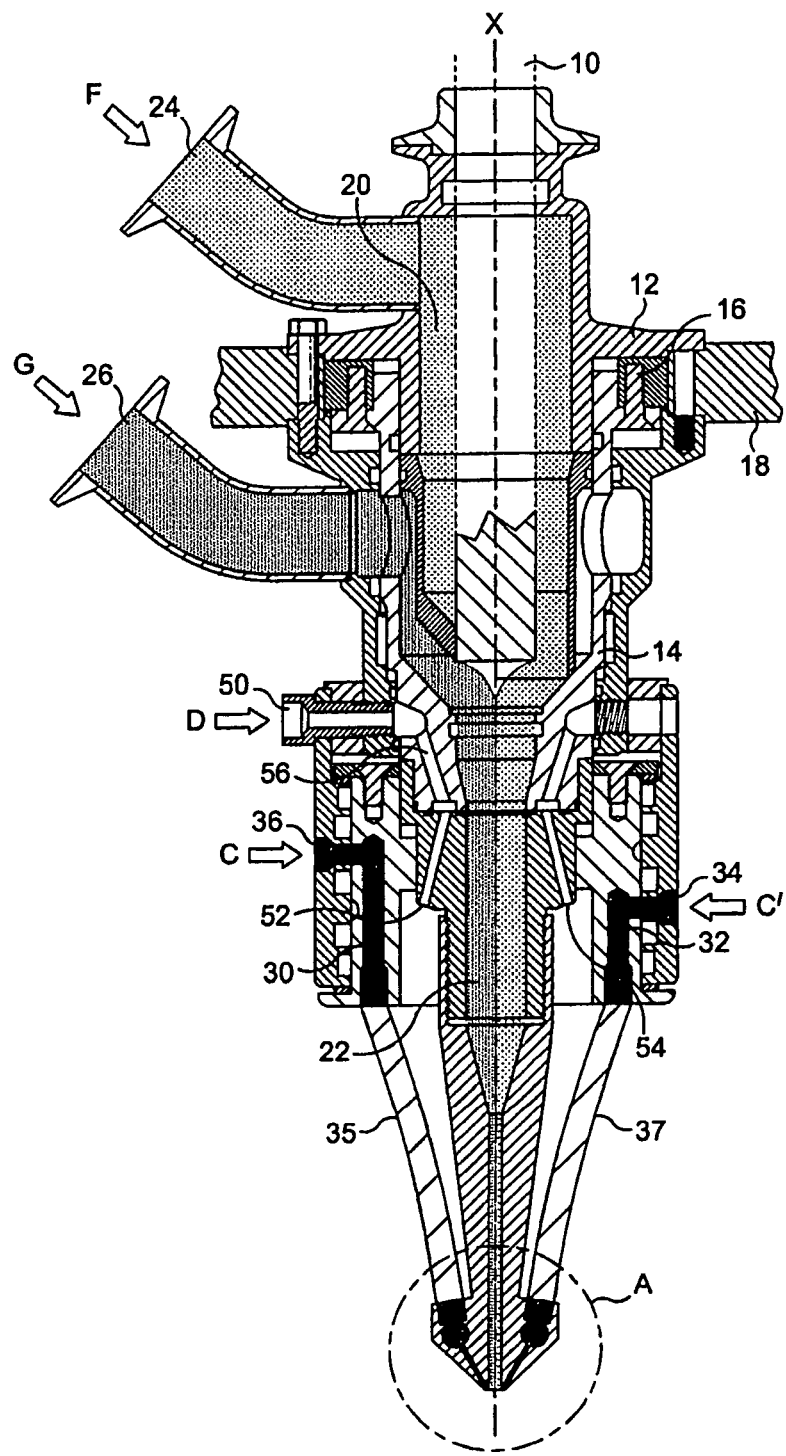
FIG. 1 shows a cross-section of an apparatus according to the invention

FIG. 1 shows a cross section of an apparatus for making a frozen confectionery product according to a preferred embodiment of the present invention. A fixed body 12 and, a rotatable nozzle 14 are mounted concentrically on a central rod 10. The nozzle 14 can be rotated with respect to the fixed body 12 around the longitudinal axis X by a gear 16. The whole apparatus is held in a frame 18 and can be moved upwards and downwards.

An ice-cream passage with an upper part 20 and a lower part 22 extends along the longitudinal axis X of the apparatus through the fixed body 12 and the rotatable nozzle 14. The passage features two inlet ports 24, 26 through which two different types of ice cream can be fed to the apparatus (direction of arrows F, G). A first inlet port 24 lies above a second inlet port 26, and when the apparatus is in use, the tubular upper part 20 of the ice cream passage is only filled with the ice cream fed thereto via the first inlet port 24. The ice cream fed to the apparatus via the second inlet port 26 joins the ice cream passage in a lower part 22 where it is no longer tubular, but cylindrical. The two types of ice cream fed into the apparatus through inlet ports 24, 26 respectively will not mix but form a bi-component ice-cream strand flowing through the lower part 22 of the ice cream passage towards an ice cream outlet port 28 (cf. FIGS. 1A and 2).

Figure 1A:
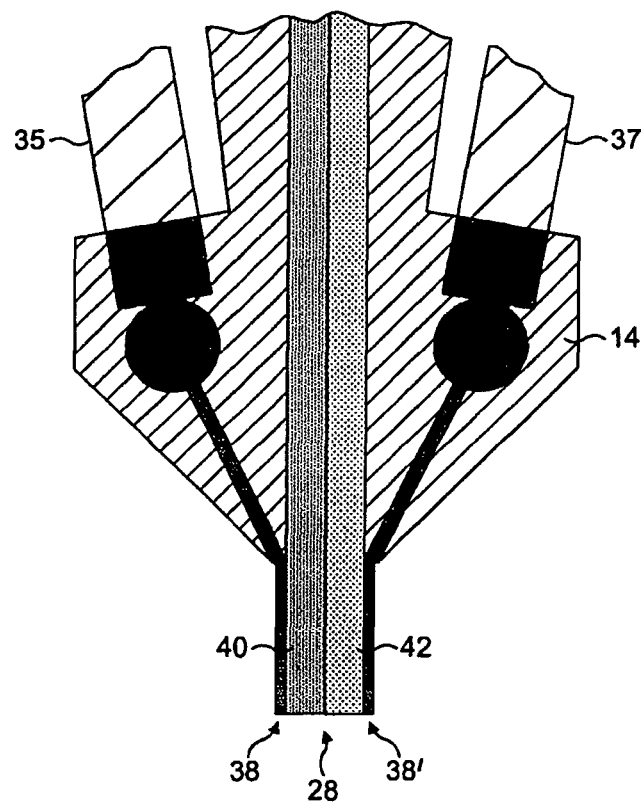
FIG. 1A shows an enlarged detail designated by "A" in FIG. 1
Figure 2:
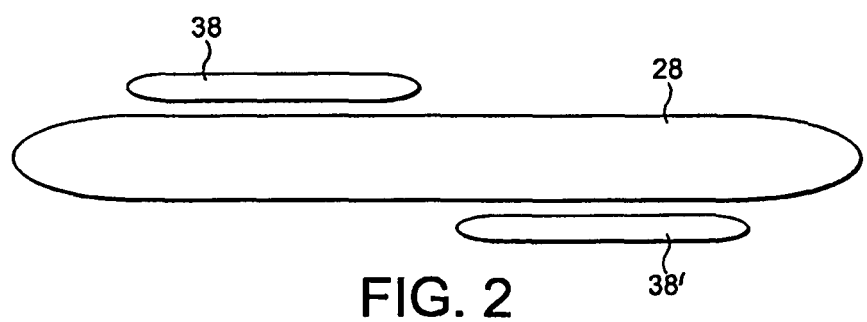
FIG. 2 is a schematical drawing of the outlet ports of the apparatus shown in FIG. 1

The apparatus is furthermore provided with two chocolate passages 30, 32 with respectively an inlet port 34, 36 and an outlet port 38, 38' (cf. FIGS. 1A and 2). Here also, the inlet ports 34, 36 are provided in the fixed body, below the ice cream inlet ports, while the outlet ports 38, 38' are provided in the rotatable nozzle. While a first part of the chocolate passages is integrated in a body of the rotating nozzle 14, the chocolate is then led via flexible hoses 35, 37 towards the outlet ports 38, 38'. The flexible hoses 35, 37 do not touch the part of the nozzle 14 containing the lower part of the ice cream passage 22, and the liquid and warm chocolate is thus insulated from the ice cream. The chocolate passages 30, 32 and the flexible chocolate hoses 35, 37 can furthermore be heated up by hot air that is blown in through an air inlet port 50 (direction of arrow D) to flow through hot air passage 56 and towards hot air outlet port 52, 54. As the chocolate is fed separately to the two chocolate outlet ports 38, 38' through two different inlet ports 34, 36, the chocolate supply can be metered individually and there is no preferred circuit. This avoids clumping of chocolate in the circuit or at the outlet ports.

As it can be seen in FIG. 2, the outlet ports 28, 38, 38' have elongated cross-sections and extend in parallel, with the outlet ports 38, 38' of the chocolate passages 30, 32 being arranged symmetrically with respect to the central ice-cream outlet port 28. Although the schematical drawing of FIG. 2 is not on scale, one can see that the ice cream outlet port 28 is about twice as large as the chocolate outlet ports 38, 38'.

Figure 3:
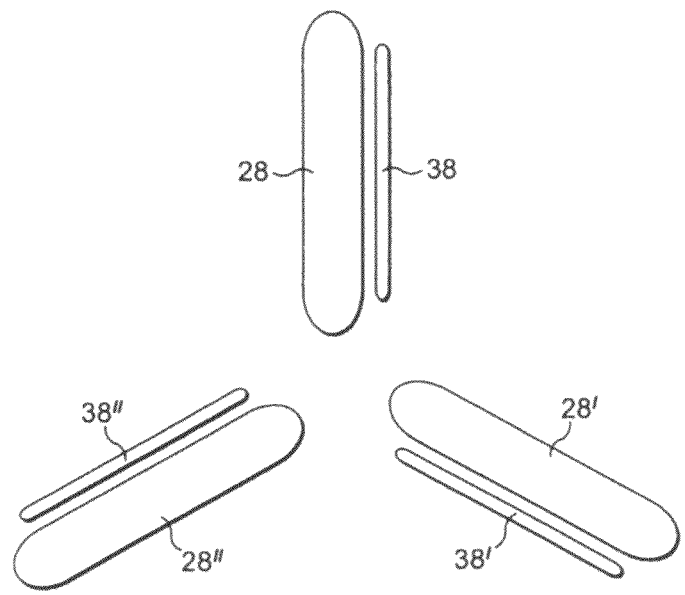
FIG. 3 is a schematical drawing of an alternative design of the outlet ports for an apparatus according to the invention

When the nozzle 14 and thus the outlet ports 28, 38, 38' are rotated during the extrusion process, an ice cream helix containing the two different ice cream flavours 40, 42 is extruded through the central ice cream outlet port 28 (cf. FIG. 3 showing a cross section through the final product) into a cylindrical tub 60. By means of the two chocolate outlet ports 38, 38', two chocolate helixes 44, 46 are formed, each of them lying between two layers of ice cream 40, 42. Due to the geometry of the outlet ports 28, 38, 38' which do not overlap, the chocolate helixes will never touch each other, but always be separated by an ice cream layer.

Figure 4:
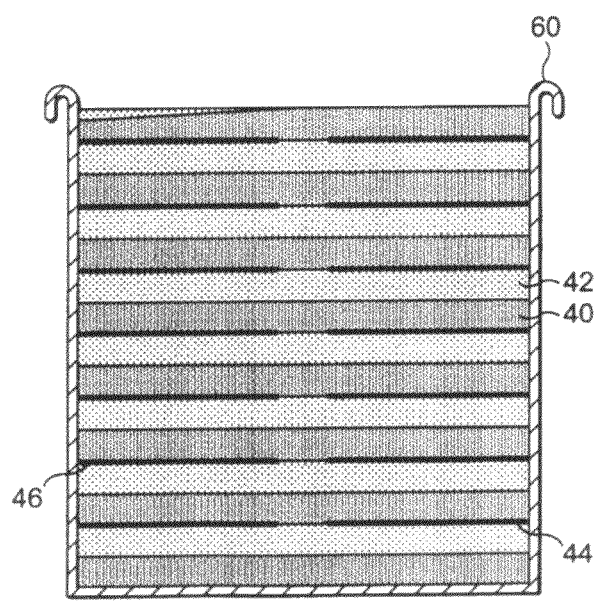
FIG. 4 shows a cross-section of a frozen ice confectionery product according to the invention.

These chocolate helixes appear as thin, basically annular or disc-like chocolate layers in the final product, as it can be seen in the cross section of FIG. 4. The chocolate layers 44, 46 have preferably a thickness between 800 μm and 1800 μm at least for 80% or 90% of the layer surface with an average thickness lying around 1300 μm. As already mentioned above, the ideal thickness preferred by consumers seeking crunchiness can vary depending on the chocolate recipe. For the embodiment shown in FIG. 4, a dark chocolate not containing any other vegetable fat than cocoa butter was used.

Figure 5:
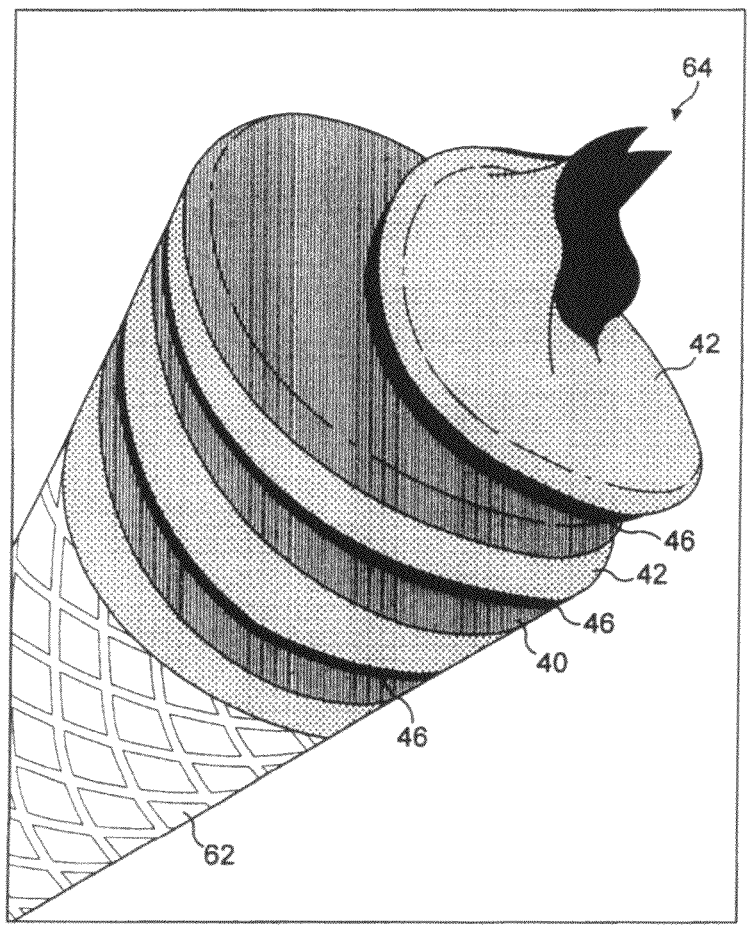
FIG. 5 shows another frozen confectionery product according to the invention.

FIG. 5 shows an alternative embodiment, where a wafer cone 62 is used as a container instead of a tub or cup. As usual, the frozen confection is filled into the wafer cone 62 and continues on top thereof in a shape which is a prolongation of the conical wafer. The chocolate layers 46 are partly visible from the outside. Instead of ending in a conventional flat top or ball top, the uppermost part of the frozen confection has a spiral shape 64 which makes the ice cream or sorbet layers 40, 42 and the chocolate layers 46 appear as twirl when looked at from above.

The spiral shape at the end can be achieved by adjusting the speed at which the nozzle 14 is lifted and the rotational speed of the nozzle. With the same apparatus, depending on the choice of these parameters and the timing of the opening of the valves, it is possible to achieve different shapes from a flat top to a very "steep" spiral top.

FIG. 3 shows an alternative design of the outlet ports. Three ice cream outlet ports 28, 28', 28" having an elongated cross section are arranged with an angle of 120° in between them in a star-like manner. For each ice cream outlet port 28, there is one associated chocolate outlet port 38, 38', 38" having also an elongated cross section with a slightly smaller longitudinal diameter. This design can be used with an apparatus corresponding basically to the one shown in FIG. 1, but being provided with three ice cream passages and three ice cream inlets as well as with three chocolate passages. During the extrusion process, at each chocolate outlet port 38, 38', 38", a chocolate stripe is painted on the ice cream stripe extruded through the associated ice cream outlet port 28, 28', 28". Instead of chocolate or a fat-based chocolate coating, one can extrude caramel or another softer material through one of the chocolate outlet ports, so that two chocolate layers and one caramel layer alternate in the product.

REFERENCE NUMERALS 10 rod
12 fixed body
14 rotatable nozzle
18 frame
20 ice cream passage (upper part)
22 ice cream passage (lower part)
24, 26 ice cream inlet port
28, 28', 28" ice cream outlet port
30, 32 chocolate passages
34, 36 chocolate inlet port
35, 37 flexible chocolate hose
38, 38', 38" chocolate outlet port
40, 42 ice cream
44, 46 chocolate helix/layer
50 hot air inlet
52, 54 hot air outlet
56 hot air passage
60 tub
62 wafer cone
64 spiral top

The invention claimed is:

1. An apparatus for making a frozen confectionery product by rotary vertical extrusion into a container, the apparatus comprising:
   a nozzle;
   at least one ice-cream passage with at least one inlet port and an outlet port;
   at least one chocolate passage with at least an inlet port and at least two outlet ports, the chocolate passage is insulated from the ice-cream passage and joins the ice-cream passage only at the outlet port of the ice-cream passage such that the outlet port of the at least one ice-cream passage is in the same plane as the at least two outlet ports of the at least one chocolate passage;
   the outlet ports are located in the nozzle and have elongated cross-sections, and the chocolate outlet port extends parallel to, and in the same direction as, the ice cream outlet port, so as to form an annular or helical chocolate layer upon rotation of the nozzle and the container with respect to each other.

2. The apparatus of claim 1, wherein the inlet port of the chocolate passage is a single common inlet port leading to the at least two chocolate outlet ports.

3. The apparatus of claim 1, wherein the nozzle rotates with respect to a fixed body during extrusion, and the inlet ports are located in the fixed body and the outlet ports in the rotatable nozzle.

4. The apparatus of claim 3, wherein the rotatable nozzle and the fixed body are coaxial.

5. The apparatus of claim 1, wherein the at least two outlet ports of the chocolate passage are located symmetrically with respect to the ice-cream outlet port which is positioned centrally relative to the at least two outlet ports of the chocolate passage, the at least two outlet ports of the chocolate passage comprise two chocolate outlet ports on opposite sides of the ice-cream outlet port relative to each other.

6. The apparatus of claim 1, comprising an air passage having an inlet port and an outlet port, the outlet port directed toward the chocolate passage.

7. The apparatus of claim 1, wherein the ice-cream passage has two ice-cream inlet ports both leading into the passage before the outlet port.

8. The apparatus of claim 1, wherein the longitudinal diameter of each of the chocolate outlet ports corresponds to less than half of the longitudinal diameter of the ice cream outlet port.

9. The apparatus of claim 1, wherein the at least two chocolate outlet ports have different inlet ports relative to each other and are part of different chocolate passages relative to each other.

10. The apparatus of claim 1, wherein the at least two outlet ports of the at least one chocolate passage and the outlet port of the at least one ice cream passage extend in parallel.

* * * * *